United States Patent
Fournier et al.

(10) Patent No.: US 8,579,461 B2
(45) Date of Patent: Nov. 12, 2013

(54) RECHARGEABLE FLAMELESS CANDLE SYSTEMS AND METHODS

(75) Inventors: Bernard Fournier, Delson (CA); Frederic Boucher, Delson (CA); Carlos Carpintero, Delson (CA)

(73) Assignee: Winvic Sales Inc., Markham, Ontario (CA)

( * ) Notice: Subject to any disclaimer, the term of this patent is extended or adjusted under 35 U.S.C. 154(b) by 308 days.

(21) Appl. No.: 13/096,424

(22) Filed: Apr. 28, 2011

(65) Prior Publication Data

US 2011/0317403 A1    Dec. 29, 2011

Related U.S. Application Data

(60) Provisional application No. 61/329,457, filed on Apr. 29, 2010.

(51) Int. Cl.
 *F21L 4/00* (2006.01)
(52) U.S. Cl.
 USPC .............................. 362/183; 362/392; 362/234
(58) Field of Classification Search
 USPC ......... 362/183, 392, 393, 184, 234, 253, 447,
 362/362, 249.02, 810; 320/108;
 439/123–124; 431/295
 See application file for complete search history.

(56) References Cited

U.S. PATENT DOCUMENTS

| | | | |
|---|---|---|---|
| 4,764,853 A * | 8/1988 | Thomas et al. | 362/183 |
| 5,814,968 A | 9/1998 | Lovegreen et al. | |
| 6,479,965 B2 * | 11/2002 | Barbeau et al. | 320/115 |
| 6,926,423 B2 * | 8/2005 | Bucher et al. | 362/184 |
| 7,967,484 B2 * | 6/2011 | Lederer | 362/392 |
| 8,007,144 B2 * | 8/2011 | Lederer | 362/392 |
| 8,210,708 B2 * | 7/2012 | Hau et al. | 362/183 |
| 8,454,190 B2 * | 6/2013 | Hau et al. | 362/183 |
| 2005/0169666 A1 | 8/2005 | Porchia et al. | |
| 2005/0264261 A1 * | 12/2005 | Barbeau et al. | 320/114 |
| 2007/0114969 A1 | 5/2007 | Marmaropoulos | |
| 2007/0223217 A1 * | 9/2007 | Hsu | 362/183 |
| 2007/0258226 A1 | 11/2007 | Ong et al. | |
| 2010/0124050 A1 * | 5/2010 | Hau et al. | 362/183 |

OTHER PUBLICATIONS

Declaration of Kim McCavit dated Sep. 1, 2011.

(Continued)

*Primary Examiner* — Bao Q Truong
(74) *Attorney, Agent, or Firm* — McAndrews, Held & Malloy, Ltd.

(57) ABSTRACT

According to embodiments of the present invention, a recharging device includes a recharging port that receives a flameless candle and recharges a battery in the candle. The recharging device includes a first stacking structure that has a top portion and a bottom portion. There is a top stacking contact on the top portion. The electrical power bus is connected with the top stacking contact. The top portion of the first stacking structure is configured to mate with a bottom portion of a first stacking structure of another recharging device. In an embodiment, the bottom portion of the first stacking structure has a bottom stacking contact electrically connected with the electrical power bus. The bottom stacking contact may have a pogo spring. The recharging device may also have a second stacking structure having a top portion without an electrical contact. The second stacking structure is configured to mate with a bottom portion of another second stacking structure. In an embodiment, the device has two first stacking structures and two second stacking structures.

21 Claims, 9 Drawing Sheets

(56) References Cited

OTHER PUBLICATIONS

PCT Notification Concerning Transmittal of International Preliminary Report on Patentability, in International application No. PCT/2011/034507, dated Oct. 30, 2012.

Patent Cooperation Treaty, Notification of Transmittal of the International Search Report and the Written Opinion of the International Searching Authority, or the Declaration, in International application No. PCT/US2001/034507, dated Oct. 20, 2011. (17 pages).

* cited by examiner

RECHARGEABLE FLAMELESS CANDLE SYSTEMS AND METHODS

This application claims priority to U.S. Patent Application No. 61/329,457 filed on Apr. 29, 2010, which is herein incorporated in its entirety.

BACKGROUND OF THE INVENTION

Generally, the present application relates to rechargeable flameless candles. Particularly, the present application relates to the rechargeable flameless candles themselves, devices for recharging the flameless candles, and systems that incorporate the rechargeable flameless candles.

Many people find candle light pleasant. The flickering of light and movement of shadows across a floor or on a nearby wall can be almost hypnotically soothing. As a result, candles have remained popular for generations since the invention of more practical electrical lighting, especially for decorative and mood setting purposes. However there are certain risks associated with open flames, and it may be unwise to leave a lit candle unattended.

Flameless electronic candles have provided an alternative to conventional candles. Flameless candles can simulate the flickering effect of a real candle without the danger of an open flame. Some such techniques are described in U.S. Pat. No. 6,616,308. Rechargeable batteries can be used with the flameless candle to facilitate portability of the candle. Of course, rechargeable batteries must be recharged.

Some people or businesses may wish to have many flameless candles. For example, a restaurant or caterer may want a flameless candle on each table. As another example, a spa may want flameless candles to provide a relaxing level and character of illumination. All of the rechargeable flameless candles must be recharged. There may, however, be a limited amount of available counter or shelf space to recharge a number of flameless candles. Furthermore, it may be inconvenient to orient a flameless candle in a specific manner when inserting it into a recharger. Moreover, it may be inconvenient to recharge larger candles, such as flameless pillar candles.

BRIEF SUMMARY OF THE INVENTION

According to embodiments of the present invention, a flameless candle includes a lamp and a bottom portion. The bottom portion has outer and inner recharging contacts. Each of the contacts can form an electrical connection with an external power source. The flameless candle also includes a rechargeable battery electrically connected with the recharging contacts. The battery provides power to the lamp.

The flameless candle also has outer and inner magnetically responsive portions. The magnetically responsive portions may be a part of the recharging contacts. The magnetically responsive portions can magnetically link the flameless candle through the bottom portion with a recharging port. The magnetically responsive portions may also assist the electrical connection of the recharging contacts with the external power source. Additionally, the flameless candle has a plurality of feet on the bottom portion. The feet are arranged between at least a portion of the inner recharging contact and the outer recharging contact. The plurality of feet can be received by a trench in the recharging port.

The flameless candle may have a switch that interrupts current from flowing through the lamp. The switch may be actuated through the bottom portion. The flameless candle may also include an electronics portion that has an illumination circuit and the lamp. The electronics portion is electrically connected with the rechargeable battery. The electronics portion and the battery may be secured to the bottom portion.

The flameless candle may also have a casing that receives the electronics portion and the rechargeable battery. The bottom portion may be fastened with the casing. The casing may include a translucent material that permits the flow of light from the lamp through the casing. The material may diffuse this light. The casing may have a recessed or protruding top portion. The lamp may be located in the interior of the casing. The flameless candle may also have risers between the bottom portion and the electronics portion. The risers may contain the rechargeable battery.

According to embodiments of the present invention, a flameless candle includes a flameless candle insert, a shell, and a door. The flameless candle insert has a housing, a lamp, and a rechargeable battery electrically connected with the lamp. The shell has an aperture through a bottom portion of the shell that receives the insert. The shell also has a stopping portion located above the aperture that limits insertion of the flameless candle insert. The lamp may be located within the shell when the flameless candle insert has been inserted. The shell also has a mating portion. The shell may have a wax exterior or a top portion including a recessed region and a wick.

The flameless candle further includes a door that detachably mates with the mating portion of the shell and secures the flameless candle insert within the shell. The door may rotatably mate with the mating portion. The door may include a disk, a grip protruding from a bottom surface of the door, and at least one mating tab. In an embodiment, the mating portion of the shell has a mating groove configured to receive the mating tab(s).

According to embodiments of the present invention, a recharging device includes a recharging port that receives a flameless candle and recharges a battery in the candle. The recharging port may have an inner recharging contact and an outer recharging contact. Either or both of the recharging contacts may include a pogo spring. The recharging port may have a cylindrical recessed region. The recharging port may also have at least one magnet to improve an electrical connection between the recharging port and the flameless candle. The recharging port may permit a rotation of the flameless candle across a plurality of rotational angles and recharge the battery of the flameless candle when the flameless candle is at each of the rotational angles. The recharging port may be configured such that the flameless candle can be dropped into the recharging port. In an embodiment, the device has two or more recharging ports. Each of these ports is electrically connected with an electrical power bus.

A recharging controller may separately control the current supplied to each of the recharging ports. The device may also include visual indicator(s) corresponding to the recharging port(s). The indicators may indicate the state of recharging of the flameless candle. In an embodiment, the recharging ports are arranged within a tray. The tray may have at least one handle, such as a left handle and/or a right handle on the lateral portions of the tray.

The device includes a first stacking structure that has a top portion and a bottom portion. There is a top stacking contact on the top portion. The electrical power bus is connected with the top stacking contact. The top portion of the first stacking structure is configured to mate with a bottom portion of another first stacking structure. In an embodiment, the bottom portion of the first stacking structure has a bottom stacking contact electrically connected with the electrical power bus. The bottom stacking contact may have a pogo spring. The device may also have a second stacking structure having a top portion without an electrical contact. The second stacking structure is configured to mate with a bottom portion of another second stacking structure. In an embodiment, the device has two first stacking structures and two second stacking structures.

According to embodiments of the present invention, a method for recharging a flameless candle includes stacking a first recharging device with a second recharging device. The flameless candle is dropped into a recharging port in the first recharging device. The method also includes the step of unstacking the first recharging device from the second recharging device. In an embodiment, the method includes the step of recharging a battery of the flameless candle through the recharging port. The method may also include the step of dropping a plurality of flameless candles into a corresponding plurality of recharging ports in the first recharging device. In an embodiment, a visual indicator indicates a recharging state of the battery of the flameless candle. In an embodiment, the flameless candle is sequentially dropped into the recharging port a plurality of different rotational angles of the flameless candle.

Figure 1:
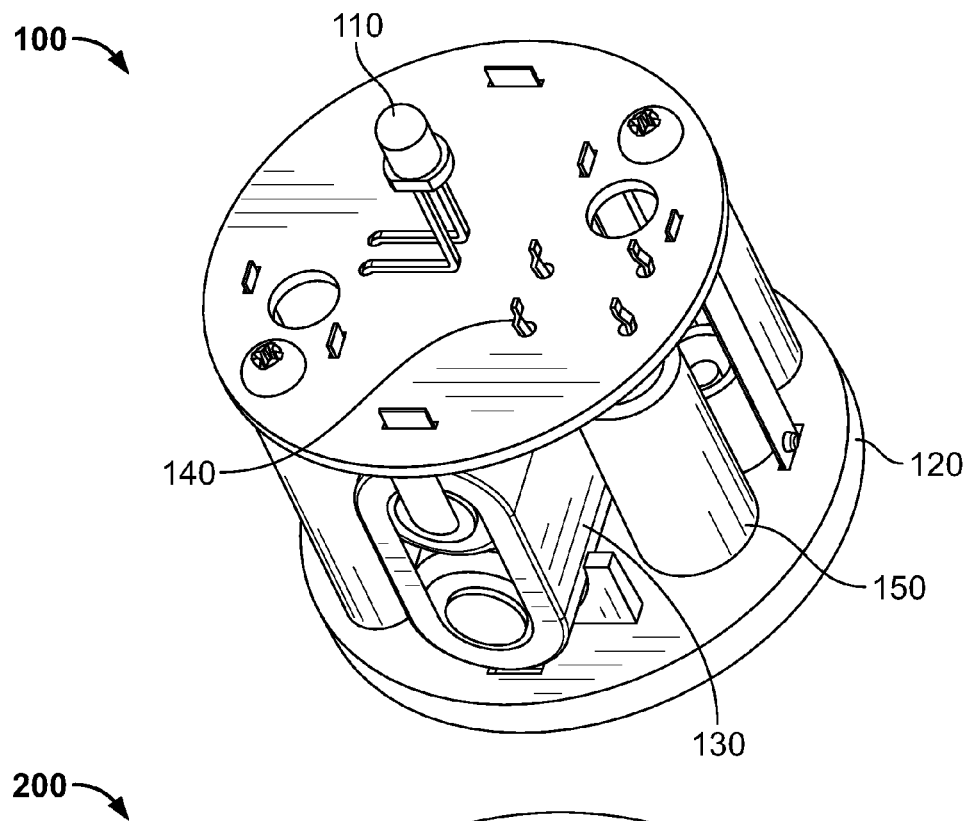
FIG. 1 shows a flameless candle core, according to an embodiment of the present invention.

The foregoing summary, as well as the following detailed description of certain embodiments of the present invention, will be better understood when read in conjunction with the appended drawings. For the purposes of illustration, certain embodiments are shown in the drawings. It should be understood, however, that the claims are not limited to the arrangements and instrumentality shown in the attached drawings. Furthermore, the appearance shown in the drawings is one of many ornamental appearances that can be employed to achieve the stated functions of the system.

DETAILED DESCRIPTION OF THE INVENTION

FIG. 1 shows a flameless candle core 100 including a lamp 110, a bottom portion 120, a rechargeable battery 130, an electronics portion 140, and one or more risers 150, in accordance with an embodiment of the present invention. The flameless candle insert 100 may also include a switch (not shown).

The rechargeable battery 130 may be capable of powering the lamp 110 and a circuit on the electronics portion 140. The rechargeable battery 130 may include one or more battery cells. The rechargeable battery 130 may be nickel cadmium, nickel metal hydride, lithium ion, and/or other types of rechargeable batteries. In an embodiment of the present invention, the rechargeable battery 130 includes two battery cells in series.

The lamp 110 may be one or more light emitting diodes ("LED") or incandescent bulbs. The rechargeable battery 130 may be electrically connected with the lamp 110 or the electronics portion 140, and may be configured to provide electrical power to the lamp 110 (either directly or through the electronics portion 140). A switch may be configured to interrupt a flow of current through the lamp 110 so that the rechargeable battery 130 does not provide electrical power to the lamp 110. For example, the switch could cause a circuit to open or close—either by directly switching the flow of current or by implementing the switch to toggle the state of an input to a circuit or processor that controls the flow of current through the lamp. The switch may toggle or otherwise adjust other aspects, such as the level of light intensity or the type of flickering emitted from the lamp 110.

The electronics portion 140 may include an illumination circuit designed to illuminate the lamp 110. For example, an illumination circuit could be designed to vary the current flowing through the lamp 110 to cause the lamp 110 to approximate the behavior of a real candle flame. An illumination circuit could implement one or more oscillator circuits and/or a microprocessor. As an example, the illumination circuit could be two or more oscillator circuits, each of which are capable of operating at different frequencies and/or phases. In this example, the sum of the outputs of the oscillation circuits could be employed to variably control the current flowing through the lamp 110, thereby creating a flickering illusion of a real candle flame. As another example, the illumination circuit may be a microprocessor executing one or more algorithms.

The lamp 110 may be secured to the electronics portion 140. For example, leads from the lamp 110 may be secured to the electronics portion 140 through soldering, bending, or crimping. The height of the lamp 110 from the electronics portion 140 may be adjusted by shortening or lengthening the leads.

One or more risers 150 may extend from the bottom portion 120 to support the electronics portion 140 and/or other portions of the flameless candle insert 100. For example, the riser(s) 150 may be interposed between the bottom portion 120 and the electronics portion 140. The risers 150 may also be configured to contain the rechargeable battery 130.

The electronics portion 140 or the rechargeable battery 130 may be secured to the bottom portion 120. For example, the bottom portion 120 may have tabs extending upwards that mechanically secure to the electronics portion 140 or the rechargeable battery 130. The tabs may be mechanically secured by soldering the tabs around or to the electronics portion 140 or the rechargeable battery 130. The tabs may also be secured by bending or crimping the tabs around or to the electronics portion 140 or the rechargeable battery 130. Mechanical fasteners and other securing techniques may also be used. The tabs may be used to simultaneously create electrical connections and mechanically secure the bottom portion 120 to the electronics portion 140 or the rechargeable battery 130.

The flameless candle core 100 may also include a magnetically responsive material. The magnetically responsive material may be a separate portion of the flameless candle core or may be embedded or integrated in another portion. For example, the magnetically responsive material may be embedded in the bottom portion 120, as further described below. The magnetically responsive material may cause the flameless candle core 100 to be magnetically attracted to another object (or portion of an object), such as a recharging port as further described below.

Figure 2:
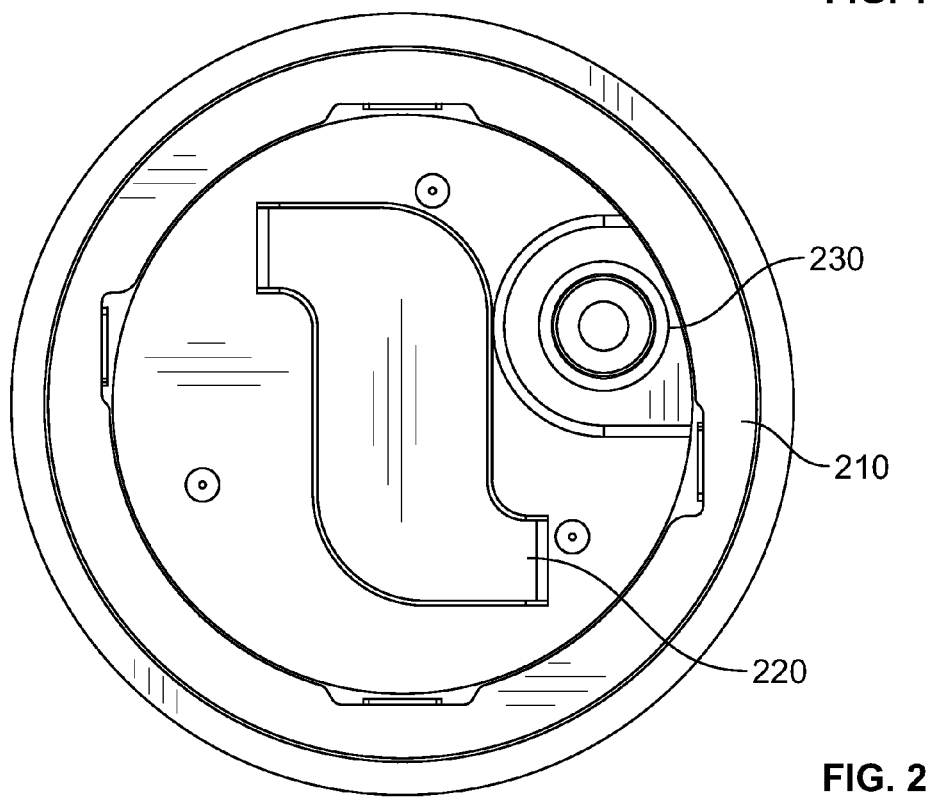
FIG. 2 shows a bottom view of a bottom portion of a flameless candle core, according to an embodiment of the present invention.

FIG. 2 shows a bottom view of a bottom portion 200 of a flameless candle insert including an outer recharging contact 210, an inner recharging contact 220, and a switch actuator 230, in accordance with an embodiment of the present invention. The bottom portion 200 may be similar to bottom portion 120.

The outer and inner recharging contacts 210, 220 may be electrically connected with a rechargeable battery, such as rechargeable battery 130. The outer and inner recharging contacts 210, 220 may also be configured to form an electrical connection with an external power source. For example, the outer and inner recharging contacts 210, 220 could be configured to connect to a direct current ("DC") power supply to charge a rechargeable battery, such as rechargeable battery 130. The outer and inner recharging contacts 210, 220 may include an electrically conductive material. The outer and inner recharging contacts 210, 220 may also include a magnetically responsive material, such as a material attracted to a magnet. The magnetically responsive material may be configured to assist an electrical connection of the outer and inner recharging contacts 210, 220 to the external power source.

The outer recharging contact 210 may be substantially in the form of a round shape. For example, the outer recharging contact 210 could form a ring shape. The inner recharging contact 220 may be substantially surrounded by the outer recharging contact 210. The inner recharging contact 220 could form an "S"-type or "backwards S"-type shape. A portion of the inner recharging contact 220 may be located at the center of the bottom portion 200. The outer recharging contact 210 and/or inner recharging contact 220 may have one or more tabs that extend through the bottom portion 200. The portion of the tabs that extend through the bottom portion 200 may be the portions of the contact(s) that connect with electronic components in a flameless candle insert, such as circuits on the electronics portion 140, the lamp 110 and the rechargeable battery 130.

The switch actuator 230 may be configured to actuate a switch that interrupts the current flowing through the lamp. The switch actuator may be part of a switch that is a slide switch, push button switch, et cetera. The switch actuator 230 may also be part of a switch that toggles or otherwise adjusts other aspects of the flameless candle, such as the level of light intensity and the type of flickering emitted by the lamp 110. A portion of the switch actuator 230 and/or the switch may traverse through a riser and up to an electronics portion.

Also shown as part of the bottom portion are three feet (each appearing as two small concentric circles) in a triangular configuration. The feet may protrude in a downward direction such that the outer and inner recharging contacts will not lie directly on a resting surface. Because the flameless candle has recharging contacts on the bottom portion, it may be advantageous to keep the contacts elevated above the resting surface which may have a potentially damaging substance, such as liquid.

Figure 3:
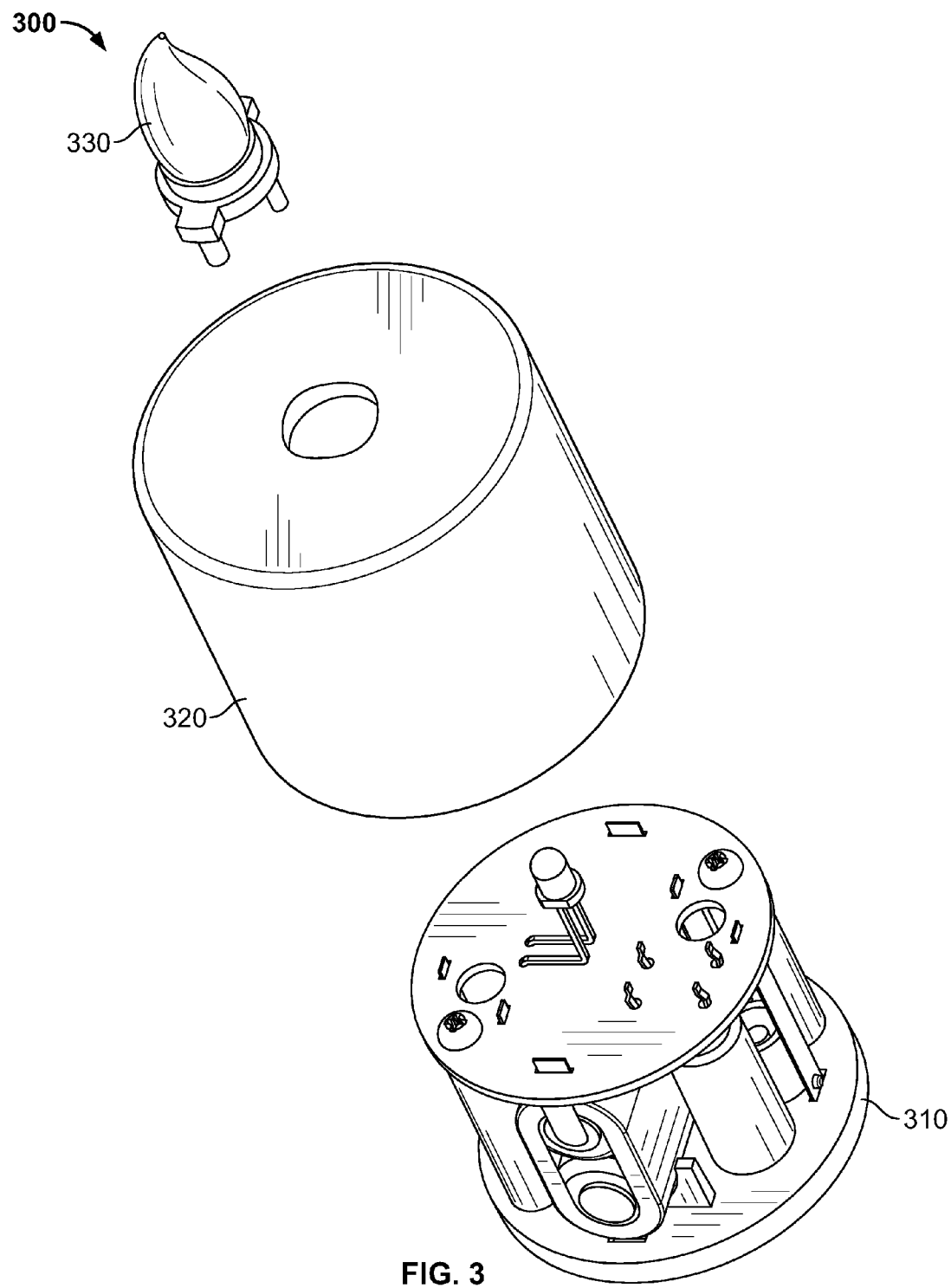
FIG. 3 shows a flameless candle, according to an embodiment of the present invention.
Figure 4:
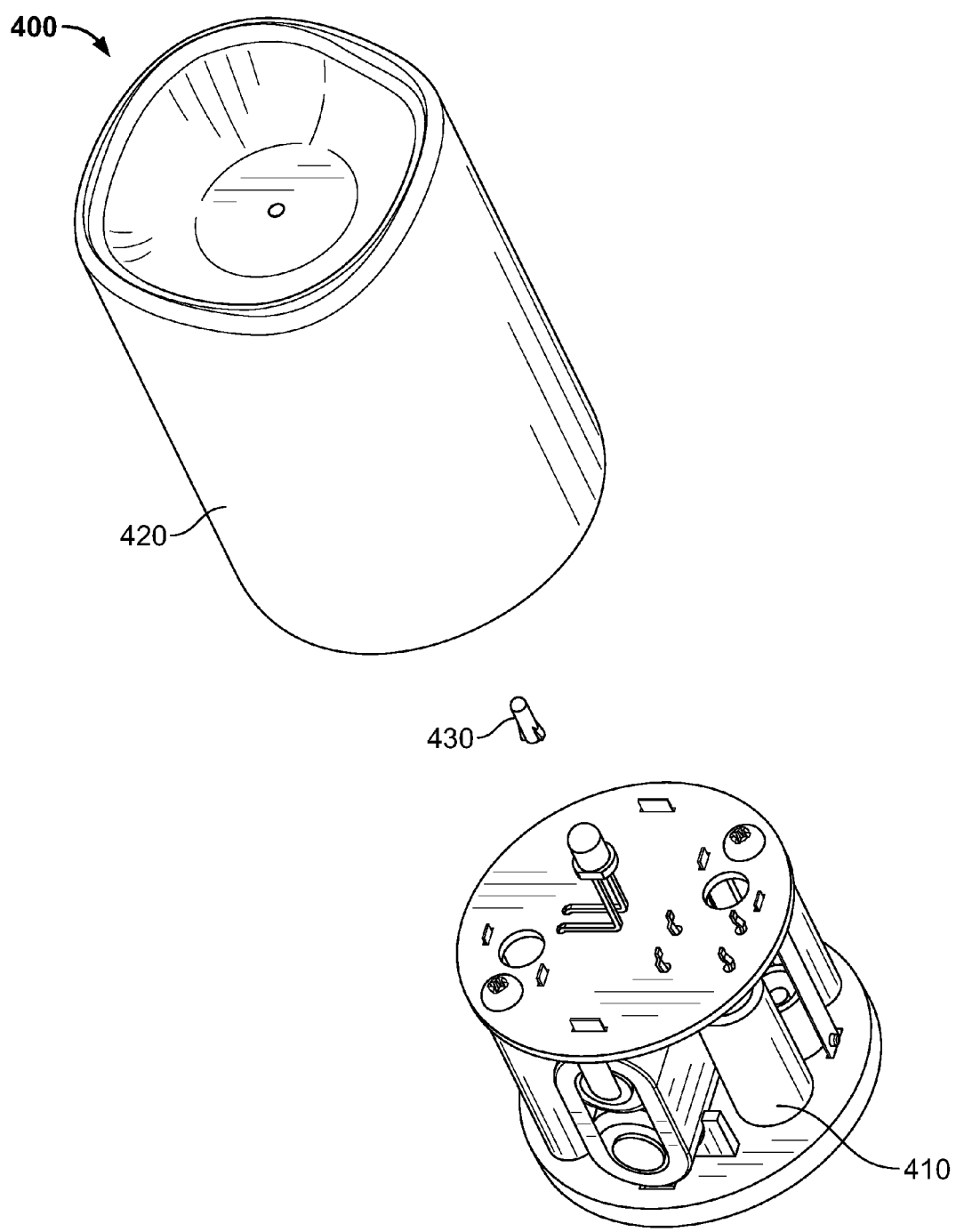
FIG. 4 shows a flameless candle, according to an embodiment of the present invention.
Figure 5:
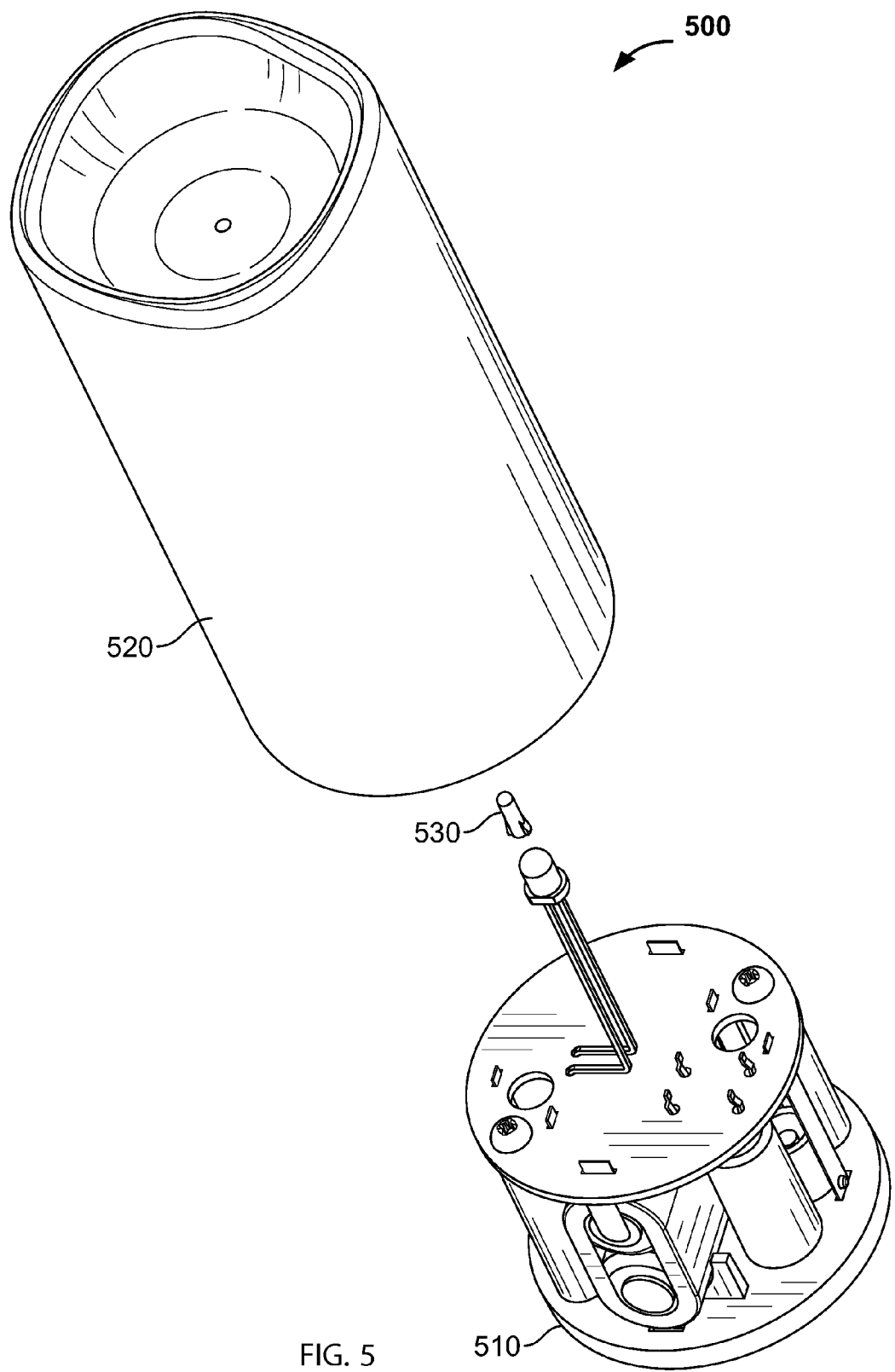
FIG. 5 shows a flameless candle, according to an embodiment of the present invention.

FIGS. 3, 4, and 5 illustrate different flameless candles 300, 400, and 500, according to embodiments of the present invention. Each of the flameless candles 300, 400, and 500 are depicted with corresponding flameless candle cores 310, 410, and 510 and casings 320, 420, and 520. The casings 320, 420, and 520 may have interior regions which are designed to encase the flameless candle cores 310, 410, and 510. The flameless candles 300, 400, 500 may be substantially cylindrical, and may be rotatable around the cylindrical axes at various rotational angles.

FIG. 3 shows a flameless tea light 300, according to an embodiment of the present invention. The flameless tea light 300 includes a flameless candle core 310 (similar to flameless candle core 100), a casing portion 320, and a protruding top portion 330. The casing portion 320 may have an interior region configured to receive the flameless candle core 310. The casing portion 320 and flameless candle core 310 may connect by using friction, fasteners (e.g., screws or rivets), epoxy, and/or the like. The casing portion 320 and the flameless candle core 310 may be permanently connected or removably connected (e.g., connected through removable screws). The casing portion 320 may encase the entire flameless candle core 310, or only a portion thereof.

The flameless tea light 300 may also include a protruding top portion 330 which extends above the casing portion 320. The protruding top portion 330 may have a flame shape, such as the one shown in FIG. 3. Other shapes are possible too, such as a half-sphere, a cylinder, a cylinder with a rounded top, and/or the like. The casing portion 320 and/or the protruding top portion 330 may include a transparent or translucent material (e.g., silicon) that facilitates presenting an illusion of a real flame candle. A lamp in the flameless candle core 310 may extend fully or partially into the protruding top portion 330, or maybe located below the protruding top portion 330. The lamp in the flameless candle core 310 may be located such that light is emitted through the protruding top portion 330. The protruding top portion 330 may be an integral part of the casing 320 or may be a separate piece used together with 320 to form a casing. The protruding top portion 330 may also be an ornament on the casing 320. The casing portion 320 may also include a recessed portion at the top to simulate a used candle.

FIG. 4 shows a flameless votive candle 400, according to an embodiment of the present invention. In many respects, the flameless votive candle 400 is similar to the flameless tea light 300. The flameless votive candle 400 includes a flameless candle insert 410 (similar to flameless candle insert 100), a casing portion 420, and a wick portion 430. The casing portion 420 may be configured to receive the flameless candle insert 410. The casing portion 420 and flameless candle insert 410 may connect by using friction, fasteners (e.g., screws or rivets), epoxy, and/or the like. The casing portion 420 and the flameless candle insert 410 may be permanently connected or removably connected (e.g., connected through removable screws). The casing portion 420 may encase the entire flameless candle insert 410, or only a portion thereof. The flameless votive candle 400 may also include a wick portion 430 which extends through or above the casing portion 420. The wick portion 430 may simulate the appearance of a wick. For example, the wick portion could be black and could be a stubby cylinder. Other shapes are possible too, such as a longer wick, a curved wick, and/or the like. The casing portion 420 and/or the wick portion 430 may include a translucent material that facilitates presenting an illusion of a real flame candle. The casing portion 420 may include a recessed portion at the top to simulate a candle that has been used.

The flameless candle 400 is shown having a recessed portion 440 on the top of the casing 420, as well as a wick 430. The wick 430 may be an integral part of casing 420, or may be a separate piece which extends through the top of the casing 420 or is an ornamental attachment to the casing 420.

The flameless candle 500 is similar in many respects to flameless candle 400. The flameless candle 500, however, is shown as being taller than the flameless candle 400. Furthermore the lamp in the flameless candle core 510 has been located in a higher position so as to locate the light source closer to the wick 530.

Figure 6A:
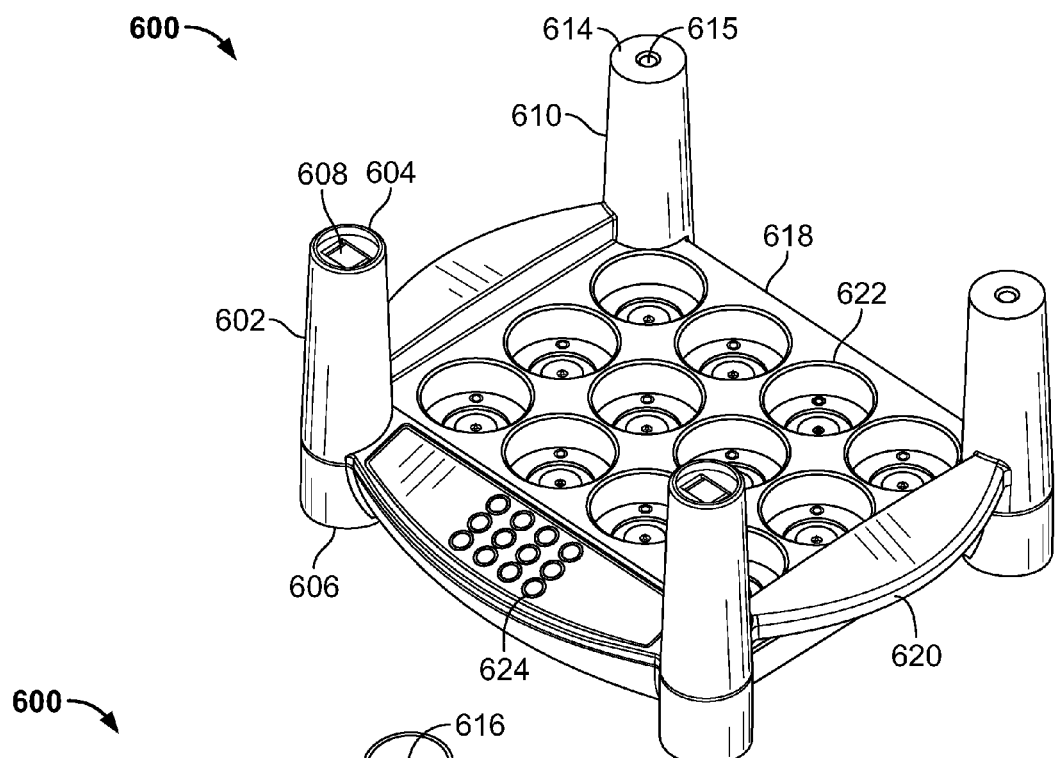
FIGS. 6A and 6B show a recharging device, according to an embodiment of the present invention.
Figure 6B:
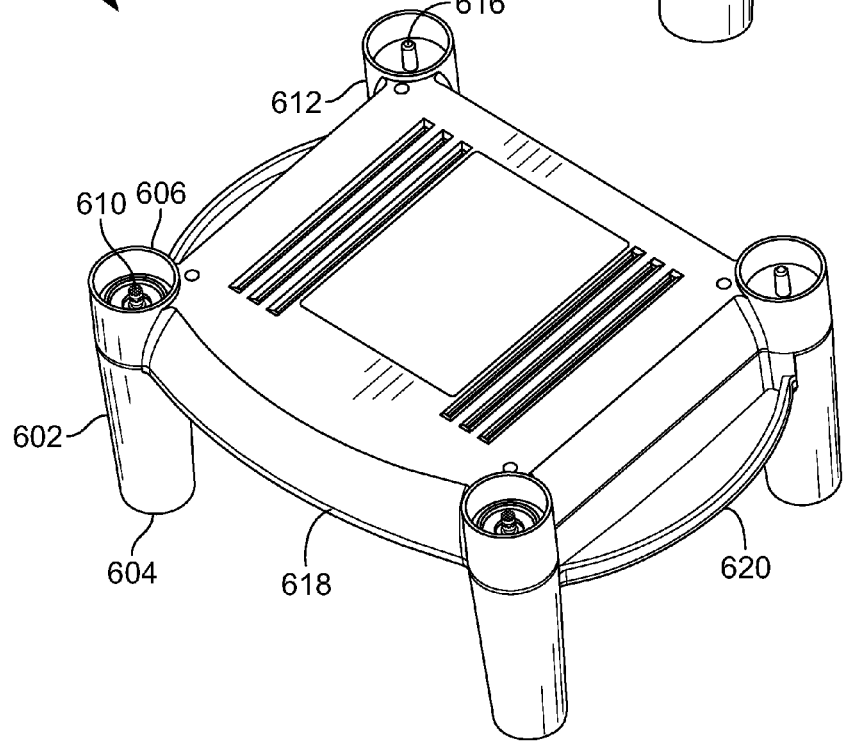

FIGS. 6A and 6B show a recharging device 600, in accordance with an embodiment of the present invention. The recharging device 600 may be capable of recharging batteries in flameless candles. The recharging device 600 may include a recharging port 622. As shown in FIG. 6A, the recharging device 600 has twelve recharging ports 622 in a 3×4 array, and each of the recharging ports 622 is configured to receive a flameless candle and recharge a battery of the flameless candle.

The recharging device 600 may also include an electrical power bus that is electrically connected with one or more recharging ports 622. The recharging ports 622 may be connected in parallel across the electrical power bus. The electrical power bus may be configured to be electrically connected with a power supply, such as a converter (AC/DC, DC/DC, AC/AC, etc.) or one or more batteries. The electrical power bus may be electrically connected with an input jack on the recharging device 600.

Figure 7A:
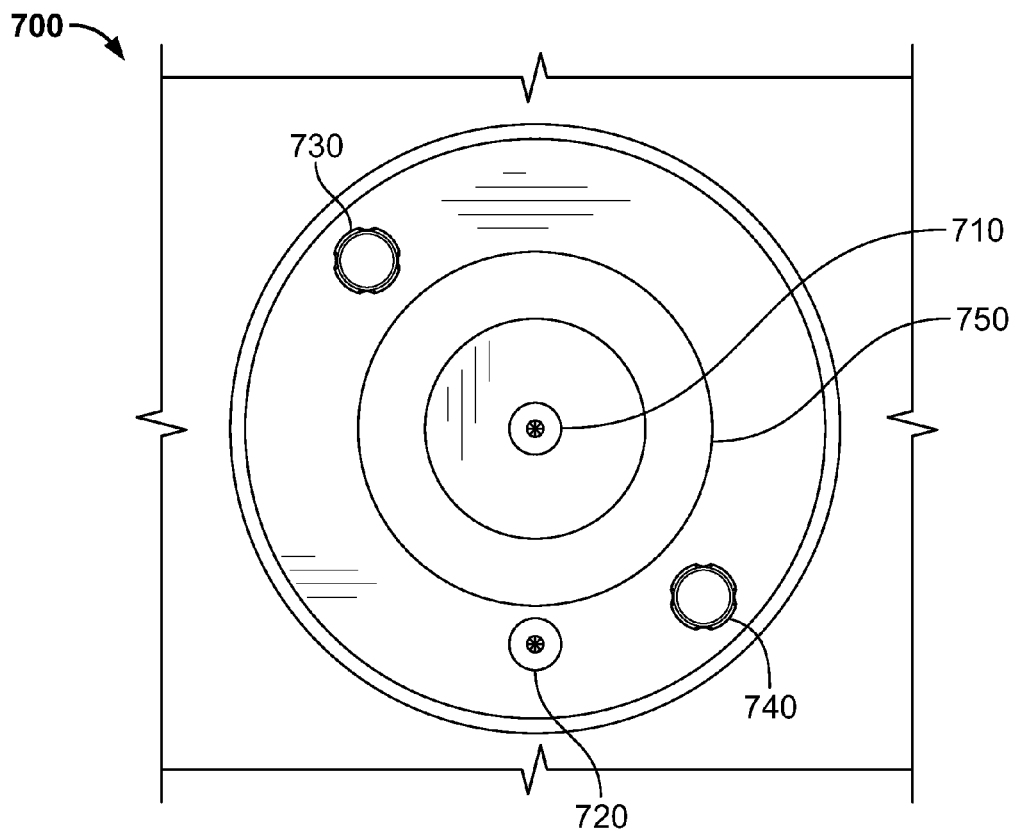
FIGS. 7A and 7B show a recharging port, according to an embodiment of the present invention.
Figure 7B:
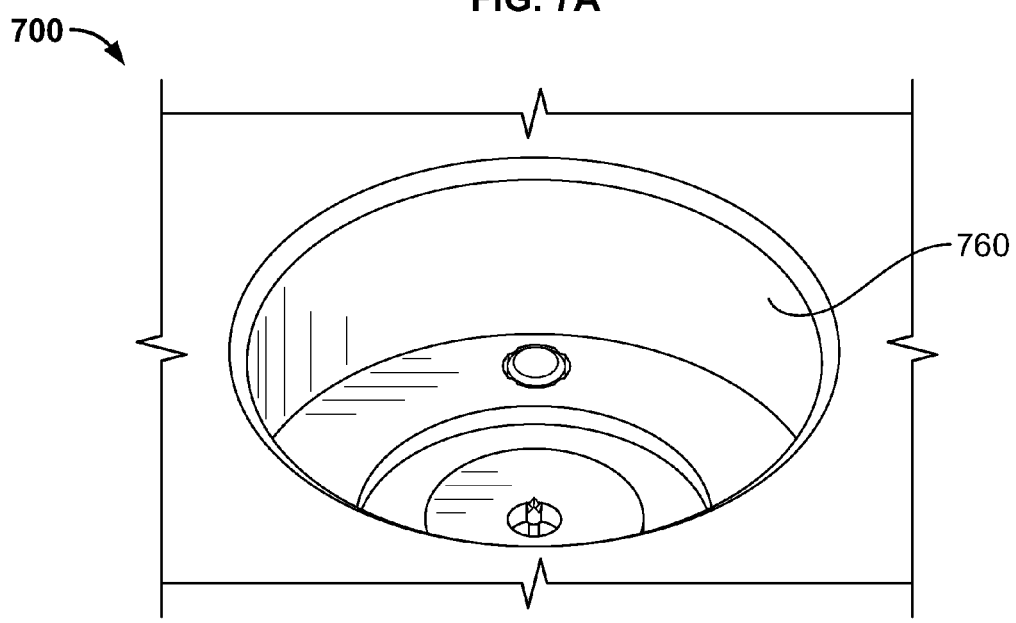
Figure 8A:
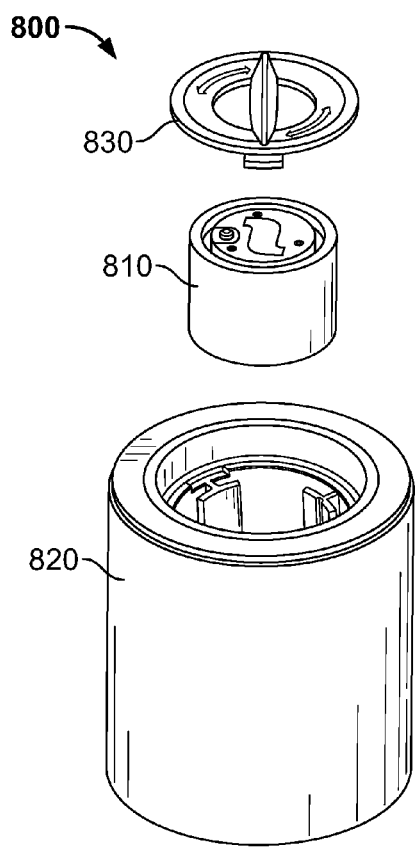
FIGS. 8A-8E show a flameless candle system 800, according to an embodiment of the present invention.
Figure 8B:
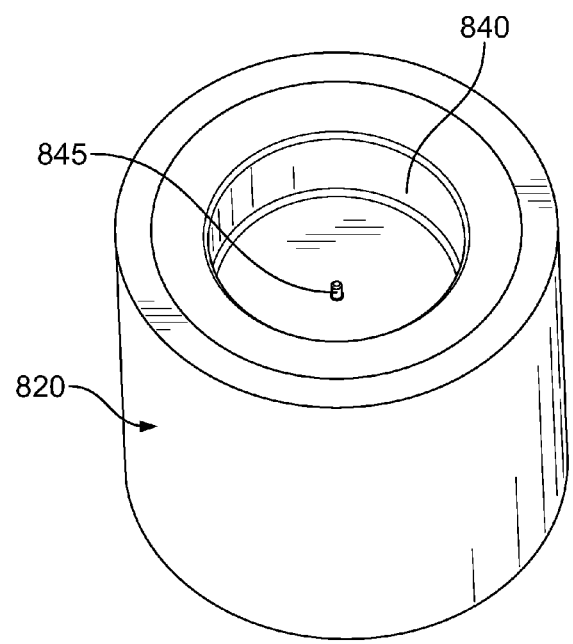
Figure 8C:
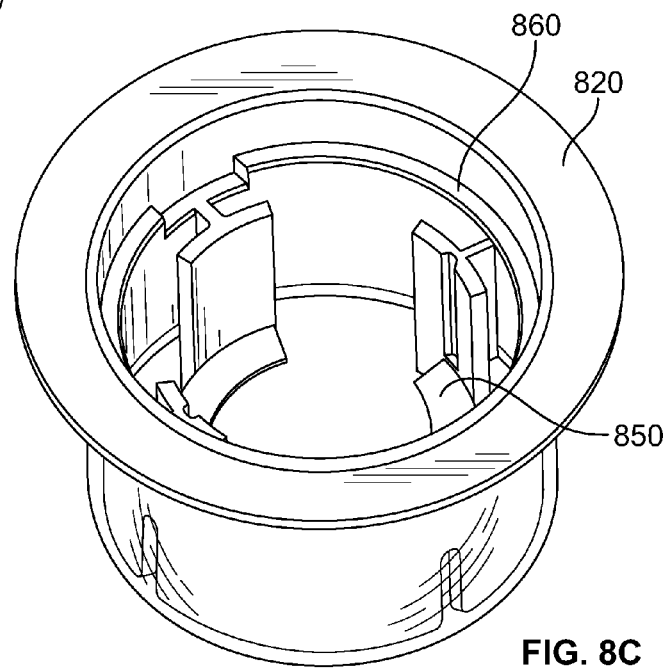
Figure 8D:
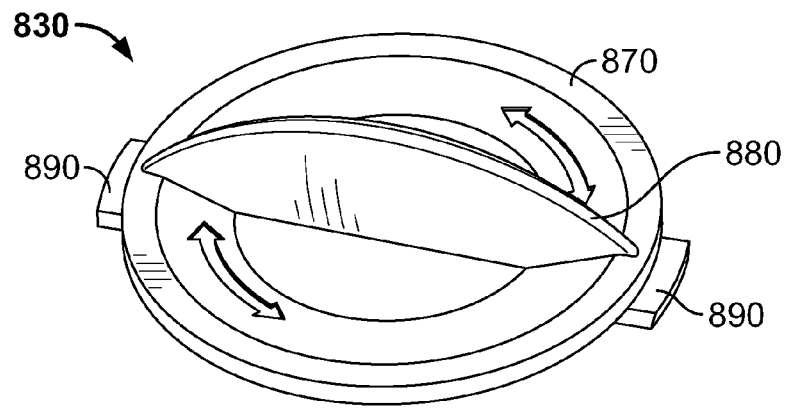
Figure 8E:
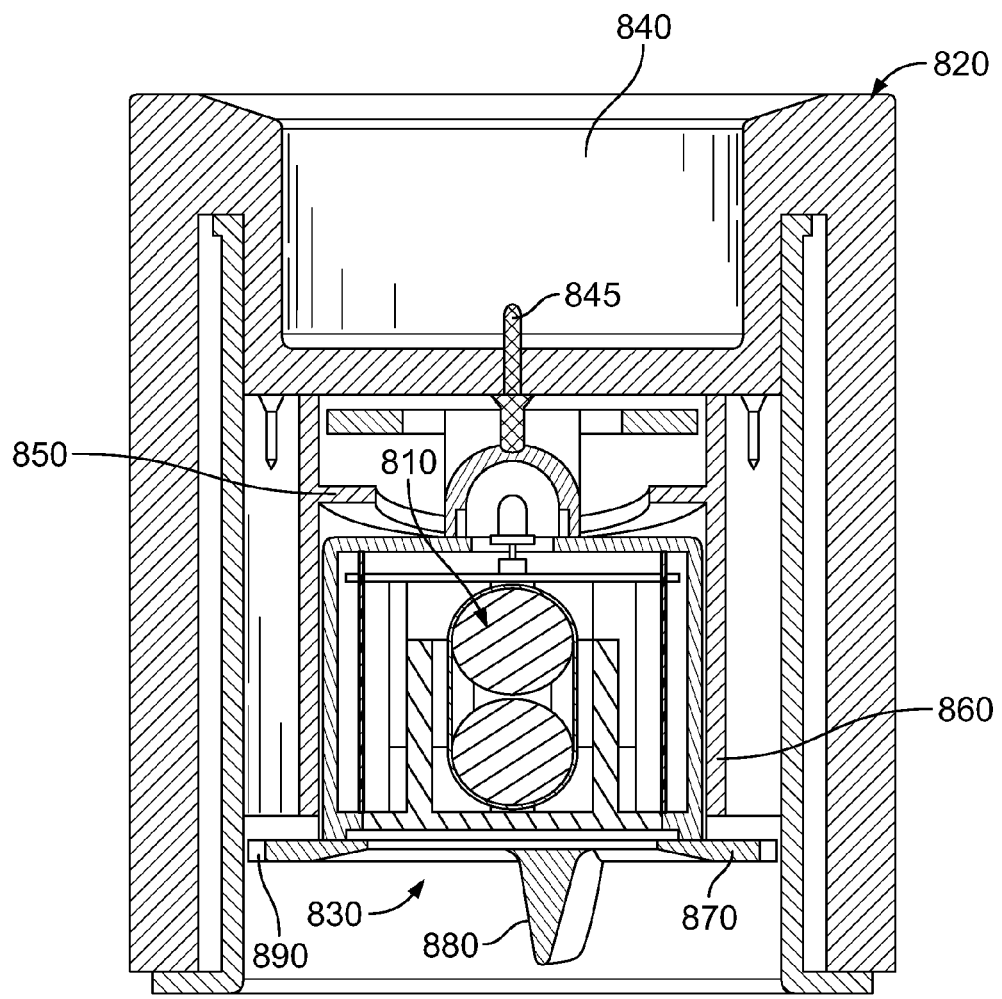

Turning for a moment to FIGS. 7A and 7B, a recharging port 700 (similar to recharging port 622) is shown in accordance with an embodiment of the present invention. The recharging port 700 may include an inner recharging contact 710, an outer recharging contact 720, a first magnet 730, a second magnet 740, a trench 750, and a recessed region 760. The recharging port 700 may be configured to receive a flameless candle and recharge a battery of the flameless candle through the inner recharging contact 710 and the outer recharging contact 720. The recharging port 700 may be configured to permit a rotation of the flameless candle across a plurality of rotational angles. This may permit recharging of the flameless candle in a variety of positions, rather than requiring the flameless candle and the recharging port to be keyed to permit recharging. For example, the recessed region 760 may be substantially cylindrical and sized corresponding to the size of the flameless candle. Once in the recharging port, the flameless candle may be rotated and still be charged in various rotational positions.

A flameless candle may be dropped into the recharging port 700. The recharging port 700 may be configured such that a bottom portion of the flameless candle (e.g., bottom portion 200) may mechanically and electrically contact the inner recharging contact 710 and the outer recharging contact 720. One or more of the recharging contacts 710, 720 may include a spring, such as a pogo spring, to facilitate mechanical and electrical contacts.

The mechanical and electrical contact with the recharging contacts 710, 720 may be facilitated by gravity or magnetism. To this end one or more magnets, such as first magnet 730 and second magnet 740, may be configured to magnetically attract the flameless candle to the recharging port 700. As discussed above, the bottom portion of the flameless candle may have electrical contacts that are electrically connected with a rechargeable battery. The bottom portion of the flameless candle may also include a magnetically responsive material, such as a material attracted to a magnet. For example, the contacts on the bottom portion of the flameless candle can include a magnetically responsive material. By using magnetism, the mechanical (and electrical) connection between the contacts on the bottom portion of the flameless candle and the recharging contacts may be facilitated or improved. The reception of the flameless candle may also be facilitated by the trench 750, which may be configured to accommodate feet on the bottom portion of the flameless candle. For example, the feet may protrude in a downward direction and may be received by the trench. If the feet are configured to elevate the contacts of the flameless candle above a resting surface, the trench 750 can be configured to receive the feet and allow the electrical contacts to rest directly on the recharging contacts 710, 720.

Turning back to FIG. 6, the recharging device 600 may be stackable with another recharging device. Stacking of recharging devices 600 may be facilitated by stacking structures, such as a first stacking structure 602 and a second stacking structure 612. The stacking structures may facilitate vertical stacking or removable stacking. Stacking may facilitate the storage and recharging of many flameless candles over a relatively small footprint.

The first stacking structure 602 may include a top portion 604, a top electrical contact 608, a bottom portion 606, and a bottom electrical contact 610. The top portion 604 of the first stacking structure 602 may be configured to removably mate with a bottom portion of another first stacking structure. Similarly, the bottom portion 606 of the first stacking structure 602 may be configured to removably mate with a top portion of another first stacking structure. Such stacking techniques can be repeated, such that three or more recharging devices can be stacked. For example, the top portion 604 may be configured as a male portion and may be received by a bottom portion configured as a female portion.

The electrical power bus of the device 600 may be electrically connected with the top electrical contact 608 or the bottom electrical contact 610. When devices are stacked, the top and bottom electrical contacts may be configured in such a way to electrically connect the electrical power busses of the stacked devices. The top electrical contact 608 may be configured to electrically contact a bottom electrical contact of another device. Similarly, the bottom electrical contact 610 may be configured to electrically contact a top electrical contact of another device. One or both of the contacts may include a spring, such as a pogo spring. The spring may facilitate mechanical and electrical contact between the top and bottom electrical contacts. For example, the bottom electrical contact 610 may have a pogo spring that facilitates contact with a top electrical contact of another device when the bottom portion 606 is mated to a top portion of another device. By connecting the electrical power busses of different devices, it may be possible to recharge flameless candles at different stacking levels with one power supply.

The second stacking structure 612 may be similar to the first stacking structure 602 in many respects. According to an embodiment, the second stacking structure may be used to mechanically facilitate the stacking of devices. The second stacking structure 610 may include a top portion 614, a bottom portion 617, and top and bottom mating portions 615 and 616. The top mating portion 615 may be a female portion, and may be configured to removably mate with a bottom male mating portion of another device, or vice versa.

In an embodiment the device has two first stacking structures 602 and two second stacking structures 612. In an embodiment, the first stacking structures 602 facilitate mechanical stacking and electrical contact between the electrical power busses of the devices, whereas the second stacking structures 612 facilitate mechanical stacking but not electrical contact. In an embodiment, the device 600 is rectangular and has two first stacking structures 602 at or near its front corners and two second stacking structures 612 at or near its rear corners.

As mentioned above, there may be one or more recharging ports 622 electrically connected with the electrical power bus of the device 600. There may also be corresponding visual indicator(s) 624 to indicate a charging state of a flameless candle in a recharging port 622. Such visual indicators 624 may be configured to indicate a recharging state of a flameless candle in corresponding recharging ports 622. The visual indicators 624 may, for example, be laid out to correspond to the distribution of recharging ports 622. As shown in FIG. 6, there are twelve recharging ports 622 in a 3×4 matrix and twelve corresponding visual indicators 624 in a corresponding 3×4 matrix.

A visual indicator 624 may include a light source such as a light emitting diode ("LED"). The nature of the illumination of the visual indicator 624 may change according to a recharging state of a flameless candle in a recharging port 622. For example, if a flameless candle is recharging, a corresponding visual indicator 624 may be illuminated, and if the flameless candle is fully charged, the visual indicator 624 may not be illuminated (or vice versa). The visual indicator 624 may indicate the state of the flameless candle by changing colors, pulsing, dimming, or other techniques. The visual indicator 624 may also indicate the presence of a flameless candle in a recharging port 622, or other aspects of charging such as fast charging, cycled charging, or trickle charging.

In order to control recharging through each of a plurality of recharging ports 622, a recharging controller may be provided. In an embodiment, a recharging controller may be configured to separately control current supplied to each of the plurality of recharging ports. Such a recharging controller may independently track the charging state of a flameless candle. For example, the recharging controller may measure the current flowing through each flameless candle or the voltage across the battery of each flameless candle. The recharging controller may control the illumination of the visual indicators 624 corresponding to the different charging states of the flameless candles in the recharging ports. In an embodiment, the recharging controller is an application specific integrated chip ("ASIC").

The device 600 may also have a tray 618. The tray 618 may be arranged to accommodate a plurality of recharging ports 622 in a horizontal plane, generally. The tray may include one or more handles 620. For example, the tray 618 may have left and right handles 620 on the lateral portions of the tray 618. The handle(s) 618 may be configured to facilitate moving or stacking the device 600.

As an illustrative example, a tray may be used in the following manner. A restaurant has forty-eight tables and each table should be illuminated with a flameless electronic candle. In this situation, four devices 600, each having twelve recharging ports 622, can be used. The devices 600 are stacked on top of each other. Specifically, the top portions 608 of two first stacking structures 602 are mated to the bottom portions 606 of two first stacking structures 602 in another device 600. When the first stacking structures 602 are mated, a top electrical contact 608 (which includes a horizontal pad) makes a mechanical and electrical contact with a bottom electrical contact 610 (which includes a vertically oriented pogo spring). The combination of the mechanical mating between the top and bottom portions 604, 606 and the pogo spring force facilitates the mechanical and electrical contact between the top and bottom electrical contacts 608, 610. In addition to the first stacking structures 602, the top portions 614 of two second stacking structures 612 of the device 600 are mated to the bottom portions 617 of two second stacking structures 612 of another device 600.

Similarly, the top portions 614 of two second stacking structures 612 are mated to the bottom portions of two second stacking structures 602 in another device 600. To assist mating, a female portion 615 is configured to receive a male portion 616. For each of the stacking structures, the mating is facilitated by friction between the top and bottom portions of the stacking structures.

In each device 600, twelve uncharged flameless candles are dropped into the recharging ports 622. Because of the nature of the recharging ports 622, the flameless candles can be dropped in at a variety of rotational angles. Therefore, it is not necessary to put a flameless candle into a recharging port 622 with a specific orientation. Furthermore, once a flameless candle is in a recharging port 622, it can be freely rotated and still be recharged. There is no "keying" required between the flameless candle and the recharging port 622 to effect recharging of the flameless candle.

After stacking, the electrical power busses of the devices 600 are electrically connected. One power supply is then connected with one of the devices 600. Because the electrical power busses are electrically connected, the one power supply can then be used to supply power to each of the electrical power busses. Because initially the batteries of the flameless candles are not charged, the corresponding indicators 624 are illuminated. The batteries of the forty-eight flameless candles are then charged. As each battery becomes charged, a corresponding indicator 624 turns off, thus indicating a charged state.

After the batteries of the flameless candles are recharged, the devices 600 are unstacked—i.e., removed from each other. Each device 600 is then carried to distribute twelve flameless candles to the tables. After distributing all of the flameless candles of the four devices, each table now has a flameless candle.

FIGS. 8A, 8B, 8C, 8D, and 8E show a flameless candle system 800, according to an embodiment of the present invention. The flameless candle system 800 is shown to include a flameless candle insert 810, shell 820, and door 830, according to an embodiment of the present invention.

The flameless candle insert 810 may be similar to one or more of the flameless candles described above. The flameless candle insert 810 may have a housing, a lamp, and a rechargeable battery electrically connected with the lamp. The flameless candle insert 810 may have a bottom portion with contacts, and may be rechargeable through a device, such as device 600.

The shell 820 may have a wax, wax-like, or waxy-appearing exterior. The shell 820 may include a bottom portion having an aperture. The aperture may be configured to receive the flameless candle insert 810. The shell 820 may also include a stopping portion 850. The stopping portion 850 may limit the insertion of the flameless candle insert 810. When inserted, the lamp of the flameless candle insert 810 may be inside the shell 820, or may protrude through the top portion of the shell 820. The stopping portion 850 may be located at a distance from the aperture so that the flameless candle insert snugly fits within the shell 820. The shell 820 may also include a mating portion 860. The mating portion may be configured to mate with the door 830, as further described below. The shell 820 may also include a top portion having a recessed region 840 and a wick 845. When inserted, the lamp of the flameless candle insert 810 may be located below the wick 845. When illuminated, the flameless candle system 800 may have the appearance of a lit candle, such as a pillar candle.

The door 830 may include a disk 870, a grip 880, and one or more mating tabs 890. The mating tab(s) 890 may be configured to detachably mate with the mating portion 860 of the shell 820. After the flameless candle insert 810 is inserted into the shell 820, the door 830 may detachably mate with the shell 820 to secure the flameless candle insert 810. The door 830 may be configured to rotatably mate with the shell 820. The grip 880 may protrude from a bottom surface of the door 830, and may facilitate rotatable mating. In an embodiment, the mating portion 860 may include a groove to receive or accommodate the mating tab(s) 890. The groove may travel a circumference or a portion thereof of the mating portion 860.

Figure 9:
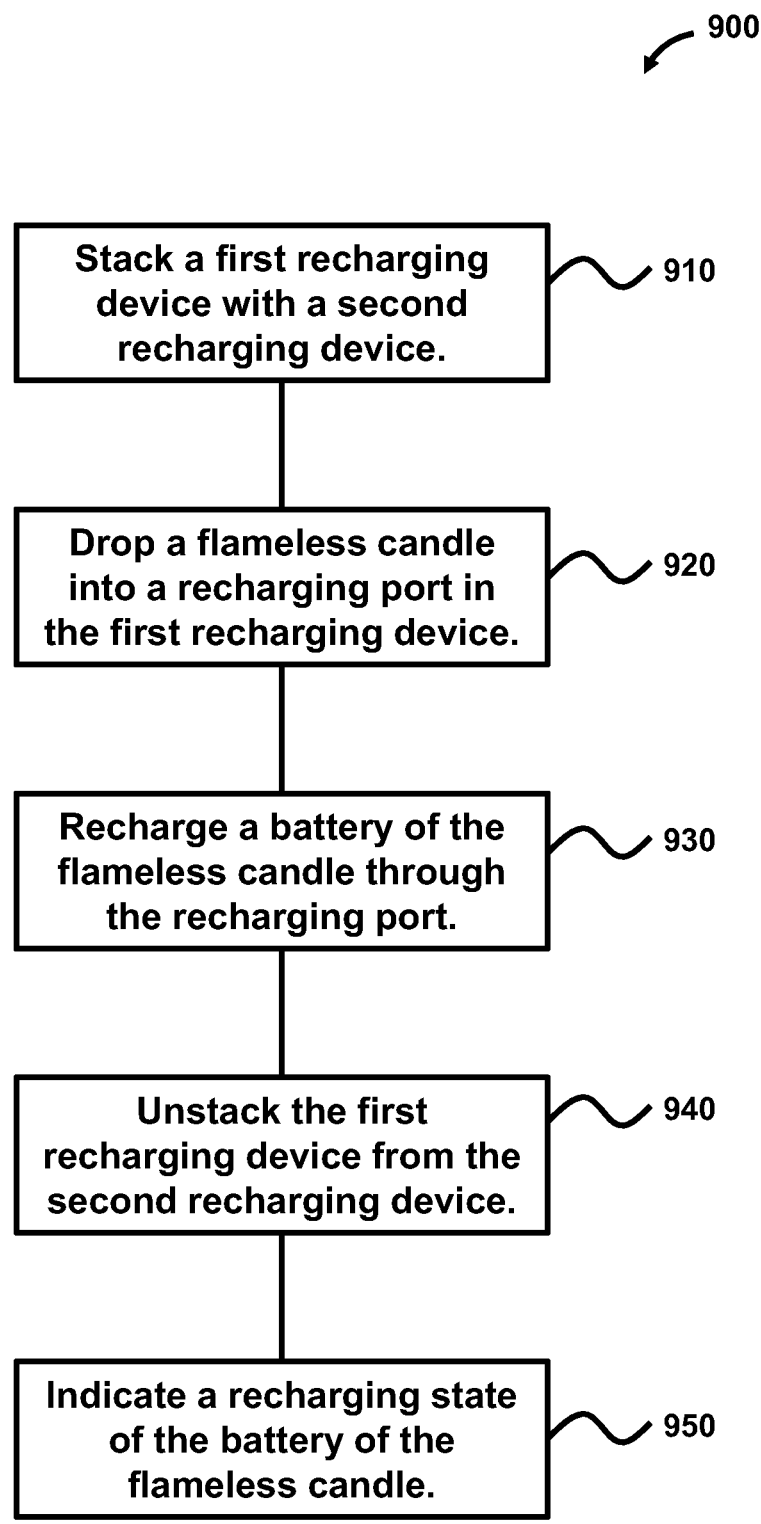
FIG. 9 shows a flowchart for a method of recharging a flameless candle, according to an embodiment of the present invention.

FIG. 9 shows a flowchart 900 for a method of recharging a flameless candle, according to an embodiment of the present invention. The steps shown in the flowchart 900 may be performable in conjunction with devices, such as flameless candles 100, 200, 300, 400, and 500. The steps may also be performable in conjunction with devices such as recharging device 600. Furthermore, the steps may be performable in a different order, or some steps may be omitted.

At step 910, a first recharging device is stacked with a second recharging device. The first and second recharging devices may be similar to recharging device 600. The first recharging device may be stacked on top of the second recharging device, or vice versa.

At step 920, at least one flameless candle is dropped into a corresponding recharging port in the first recharging device. The flameless candle may be similar to one or more of flameless candles 100, 200, 300, 400, and 500. A plurality of flameless candles may be dropped into a plurality of corresponding recharging ports in the first recharging device. Upon successive or sequential drops, the flameless candle may be dropped at different rotational angles. The first recharging device may still be able to recharge the flameless candle, regardless of the rotational angle of the flameless candle.

At step 930, one or more rechargeable batteries in the flameless candle(s) are recharged through the recharging port. At step 940 unstacking the first recharging device from the second recharging device. At step 950 a visual indicator indicates a recharging state of the battery of the flameless candle. More than one visual indicator may be employed if multiple flameless candles are used. The visual indicator may be similar to visual indicator 624 and the associated techniques.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A recharging device for recharging flameless candles, the recharging device comprising:
   a recharging port configured to receive a flameless candle and recharge a battery of the flameless candle;
   a first stacking structure including a top portion and a bottom portion;
   a top stacking contact on the top portion; and
   an electrical power bus electrically connected with the recharging port and with the top stacking contact,
   wherein the top portion of the first stacking structure is configured to mate with a bottom portion of first stacking structure of another recharging device.

2. The recharging device of claim 1, wherein the recharging port further comprises an inner recharging contact and an outer recharging contact.

3. The recharging device of claim 2, wherein at least one of the inner recharging contact and the outer recharging contact comprises a pogo spring.

4. The recharging device of claim 1, wherein the recharging port comprises a cylindrical recessed region.

5. The recharging device of claim 1, wherein the recharging port comprises at least one magnet arranged to improve an electrical connection between the recharging port and the flameless candle.

6. The recharging device of claim 1, further comprising a plurality of recharging ports each electrically connected with the electrical power bus.

7. The recharging device of claim 6, further comprising a recharging controller configured to separately control current supplied to each of the plurality of recharging ports.

8. The recharging device of claim 7, further comprising a plurality of visual indicators corresponding to the plurality of recharging ports and configured to indicate a recharging state of a corresponding plurality of flameless candles.

9. The recharging device of claim 1, wherein the recharging port is configured to receive the flameless candle and recharge the battery of the flameless candle after the flameless candle is dropped on the recharging port.

10. The recharging device of claim 9, wherein the recharging port is configured to permit a rotation of the flameless candle across a plurality of rotational angles and recharge the battery of the flameless candle when the flameless candle is at each of the rotational angles.

11. The recharging device of claim 1, wherein the bottom portion of the first stacking structure comprises a bottom stacking contact electrically connected with the electrical power bus.

12. The recharging device of claim 11, wherein the bottom stacking contact comprises a pogo spring.

13. The recharging device of claim 1, further comprising a second stacking structure comprising a top portion without an electrical contact, wherein the second stacking structure is configured to mate with a bottom portion of another second stacking structure.

14. The recharging device of claim 6, wherein the plurality of recharging ports are arranged within a tray.

15. The recharging device of claim 14, wherein the tray comprises at least one handle.

16. The recharging device of claim 15, wherein the tray comprises a left lateral portion including a left handle and a right lateral portion including a right handle.

17. The recharging device of claim 13, further comprising two first stacking structures and two second stacking structures.

18. A method for recharging a flameless candle, the method comprising:
   stacking a first recharging device with a second recharging device;
   dropping at least one flameless candle into a corresponding recharging port in the first recharging device;
   recharging a battery of the flameless candle through the recharging port;
   unstacking the first recharging device from the second recharging device.

19. The method of claim 18, wherein said dropping the flameless candle with a recharging port further comprises dropping a plurality of flameless candles into a corresponding plurality of recharging ports in the first recharging device.

20. The method of claim 18, wherein said dropping at least one flameless candle into a corresponding recharging port further comprises sequentially dropping the at least one flameless candle into the corresponding recharging port at a plurality of different rotational angles of the at least one flameless candle.

21. The method of claim 18, further comprising indicating through a visual indicator a recharging state of the battery of the at least one flameless candle.

* * * * *